(12) United States Patent
Hori et al.

(10) Patent No.: US 6,185,595 B1
(45) Date of Patent: Feb. 6, 2001

(54) DISCRETE COSINE TRANSFORMATION OPERATION CIRCUIT

(75) Inventors: Toyokazu Hori, Kodaira; Nario Sumi, Sendai; Masaru Hase, Kokubunji, all of (JP)

(73) Assignees: Hitachi, Ltd., Tokyo; Hitachi Device Engineering Co., Ltd., Chiba, both of (JP)

(*) Notice: Under 35 U.S.C. 154(b), the term of this patent shall be extended for 0 days.

(21) Appl. No.: 08/952,653

(22) PCT Filed: Feb. 28, 1996

(86) PCT No.: PCT/JP96/00461

§ 371 Date: Mar. 10, 1998

§ 102(e) Date: Mar. 10, 1998

(87) PCT Pub. No.: WO96/38794

PCT Pub. Date: Dec. 5, 1996

(30) Foreign Application Priority Data

Jun. 1, 1995 (JP) .................................................. 7-135438

(51) Int. Cl.[7] .................................................. G06F 17/14
(52) U.S. Cl. .................................................. 708/402
(58) Field of Search .................................. 708/400, 401, 708/402

(56) References Cited

U.S. PATENT DOCUMENTS 5,181,183 * 1/1993 Miyazaki .......................... 708/402
5,291,429 * 3/1994 Iwama et al. ..................... 708/402
5,596,518 * 1/1997 Toyokura et al. ................. 708/402

FOREIGN PATENT DOCUMENTS

| 3-211604 | 9/1991 | (JP) . |
| 4-277932 | 10/1992 | (JP) . |
| 4-280368 | 10/1992 | (JP) . |
| 5-181896 | 7/1993 | (JP) . |

* cited by examiner

*Primary Examiner*—Ohuong Dinh Ngo
(74) *Attorney, Agent, or Firm*—Mattingly, Stanger & Malur, P.C.

(57) ABSTRACT

One multiplier 13 operated at a normalized frequency 4 is provided to multiply the elements of DCT transformation coefficients and the elements of input data, and the multiplication results are added by a cumulative adder 15 to determine cumulative addition results corresponding to the sum (x0+x7) and the difference (x0−x7) of a pair of elements (x0, x7) of data to be outputted from a one-dimensional DCT operation circuit 1. The paired cumulative addition results are added and subtracted by an adder 17 and a subtracter 18, respectively, to determine the elements (x0, x7). The operations are performed specific times the number of which is one half of the number of elements of a column of the matrix of the input data to determine the elements of a column of the matrix of the output data and are performed specific times the number of which is equal to the number of elements of a row of the matrix or the input data to determine all the elements of the matrix of the output data. As a result, the scale of the DCT operation circuit is reduced, thereby reducing the power consumption.

3 Claims, 10 Drawing Sheets

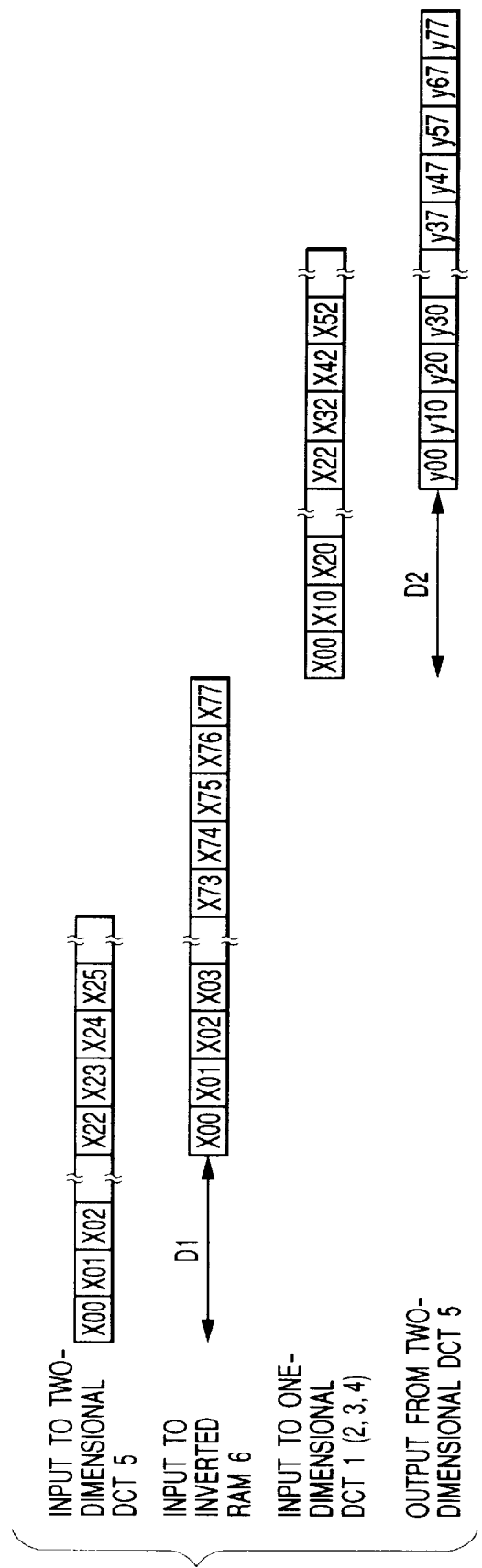

DISCRETE COSINE TRANSFORMATION OPERATION CIRCUIT

TECHNICAL FIELD

The present invention relates to a technique for processing image data and a technique for decompressing the compressed image data and, more particularly, to a technique which is useful when applied to a discrete cosine transformation operation circuit in the JPEG (Joint Photographic Experts Group) system or the MPEG (Motion Picture Experts Group) system.

BACKGROUND ART

In the prior art, the discrete cosine transformation (DCT) operation circuit is equipped with a plurality of multipliers for multiplying input data and DCT transformation coefficients.

In the case of a DCT matrix operation composed of 8 rows and 8 columns (8×8), as generally used in the JPEG system or the MPEG system, for example, there are provided eight multipliers.

However, the multiplier is equipped with a number of gates to raise a drawback that the gate scale of the entire operation circuit is enlarged. In addition, the operating frequency of the multipliers is equal to the frequency (which is equal to the frequency of the inputting timing of the input data) of the outputting timing of the DCT operation result, and the product of their ratio (i.e., "1") and the number of multipliers is as large as "8" to raise another drawback that the power consumption is increased. Specifically, the multipliers are driven with a high operating frequency, so that they consume a high power when driven. The number of the multipliers is as large as eight in the prior art so that the power consumption is further increased.

As a measure for improvement, there is disclosed in Japanese Patent Laid-Open No. 4-280368, a DCT operation circuit which is constructed by using two multipliers operated with a frequency four times as high as that of the inputting timing of the data inputted to the DCT operation circuit. In this DCT operation circuit, for example, an input data $x_{11}$ is multiplied by DCT transformation coefficients $d_{11}$, $d_{21}$, $d_{31}$ and $d_{41}$ by one multiplier, and by DCT transformation coefficients $d_{51}$, $d_{61}$, $d_{71}$ and $d_{81}$ by the other multiplier, thereby obtaining four multiplication results $x_{11}d_{11}$, $x_{11}d_{21}$, $x_{11}d_{31}$ and $x_{11}d_{41}$, and four multiplication results $x_{11}d_{51}$, $x_{11}d_{61}$, $x_{11}d_{71}$ and $x_{11}d_{81}$. The eight multiplication results thus obtained are stored in eight registers.

Another input data $x_{21}$ is also multiplied by DCT transformation coefficients $d_{12}$, $d_{22}$, $d_{32}$ and $d_{42}$ by one multiplier and by DCT transformation coefficients $d_{52}$, $d_{62}$, $d_{72}$ and $d_{82}$ by the other multiplier, thereby obtaining four multiplication results $x_{21}d_{22}$, $x_{21}d_{22}$, $x_{21}d_{32}$ and $x_{21}d_{42}$, and four multiplication results $x_{21}d_{52}$, $x_{21}d_{62}$, $x_{21}d_{72}$ and $x_{21}d_{82}$. The eight multiplication results thus obtained are stored in eight registers. Moreover, the eight multiplication results $x_{21}d_{12}$, $x_{21}d_{22}$, $x_{21}d_{32}$, $x_{21}d_{42}$, $x_{21}d_{52}$, $x_{21}d_{62}$, $x_{21}d_{72}$ and $x_{21}d_{82}$ and the preceding eight multiplication results $x_{11}d_{11}$, $x_{11}d_{21}$, $x_{11}d_{31}$, $x_{11}d_{41}$, $x_{11}d_{51}$, $x_{11}d_{61}$, $x_{11}d_{71}$ and $x_{11}d_{81}$ read out from the foregoing eight registers are added by adders, and the addition results are stored again in the aforementioned eight registers.

By repeating the operation composed of such multiplication and cumulative addition eight times, the elements $y_{11}$ to $y_{81}$ of the matrix are determined. By repeating the operation eight times, moreover, all the elements of the matrix are determined. Thus, the one-dimensional 8×8 DCT matrix operation is ended.

In the DCT operation circuit disclosed in Japanese Patent Laid-Open No. 4-280368, however, two multipliers are used and therefor improvement in the circuit scale is still needed. In other words, the number of multipliers is desirably reduced to one so that the circuit scale may be minimized.

In the DCT operation circuit of the aforementioned Laid-Open, moreover, the multipliers are operated with a frequency four times as high as that of the inputting timing of the data inputted to the DCT operation circuit. As a result, the product of the ratio (hereinafter referred to as the "normalized frequency") of the operating frequency of the multipliers to the frequency of the inputting timing of the data and the number of multipliers is "8", and no improvement has been made in the power consumption. In order to reduce the power consumption, the product of the normalized frequency and the number of multipliers is desired to be minimized as much as possible.

The invention has been made in view of the circumstances and has a main object to provide a discrete cosine transformation operation circuit whose power consumption is reduced by setting the product of the number of multipliers of a one-dimensional discrete cosine transformation operation circuit and the normalized frequency at 4 and to reduce the circuit scale by setting the number of multiplier at 1.

The foregoing and other objects and novel features of the invention will become apparent from the following description to be made with reference to the accompanying drawings.

DISCLOSURE OF INVENTION

The summary of representatives of the aspects of the invention to be disclosed herein will be described in the following.

In the discrete cosine transformation operation circuit of the invention, more specifically, there is provided one multiplier which is operated with a frequency four times as high as that of the inputting timing of the data to be inputted to the discrete cosine transformation operation circuit to sequentially multiply the elements of the DCT transformation coefficients and the elements of the input data respectively. The multiplication results are added by the cumulative adder to determine a pair of cumulative addition results which correspond to the sums and differences of the paired elements of the data to be outputted from the discrete transformation operation circuit. The operations for determining the paired elements of the output data by adding and subtracting the cumulative addition results by the adder and the subtracter specific times the number of which is one-half of the number of elements of the column of the matrix of the input data. All the elements of the matrix of the output data are determined by performing those operations specific times the number of which is equal to the number of elements of the row of the matrix of the input data.

In the discrete cosine transformation operation circuit of the invention, more specifically, there is provided one multiplier which is operated with a frequency four times as high as that of the inputting timing of the data to be inputted to the discrete cosine transformation operation circuit to sequentially multiply the elements of the DCT transformation coefficients by the elements of the input data respectively. The multiplication results are added as they are by the first cumulative adder, and the signs are alternately inverted to perform addition by the second cumulative adder specific times the number of which is one-half of the number of elements of the row of the matrix of the input data, and thereby to determine the elements of the column of the matrix of the output data. These operations are performed specific times the number of which is equal to the number of elements of the column of the matrix of the input data to determine all the elements of the matrix of the output data.

Moreover, there are provided two multipliers to be operated with a frequency two times as high as that of the inputting timing of the data to be inputted to the discrete cosine transformation operation circuit, the DCT transformation coefficients are divided into two sets and stored in a ROM so that the respective multiplications of the elements of the sets of the DCT transformation coefficients and the elements of the input data may be simultaneously performed by the two multipliers.

One or both of the discrete cosine transformation operation circuits are used to construct a two-dimensional discrete cosine transformation operation circuit comprising: a pair of one-dimensional discrete cosine transformation operation circuits; and an inverted RAM for performing the matrix operations, in which the elements of a row and the elements of a column of a matrix composed of operation results $x_{00}$, $x_{01}$, $x_{02}$, . . . received from the one-dimensional DCT operation circuit on the input side, are exchanged, to output the operation results $x_{00}$, $x_{10}$, $x_{20}$, . . . to the one-dimensional DCT operation circuit on the output side.

According to the above-specified means, the product of the number of multipliers and the normalized frequency is 4 in the one-dimensional discrete cosine transformation operation circuit, so that the power consumption can be reduced. Thanks to the single multiplier, moreover, the scale of the discrete cosine transformation operation circuit is reduced.

BRIEF DESCRIPTION OF DRAWINGS

FIG. 10 is a time chart showing a part of the operation timings of the DCT operation circuit.

BEST MODE FOR CARRYING OUT THE INVENTION

Figure 1:
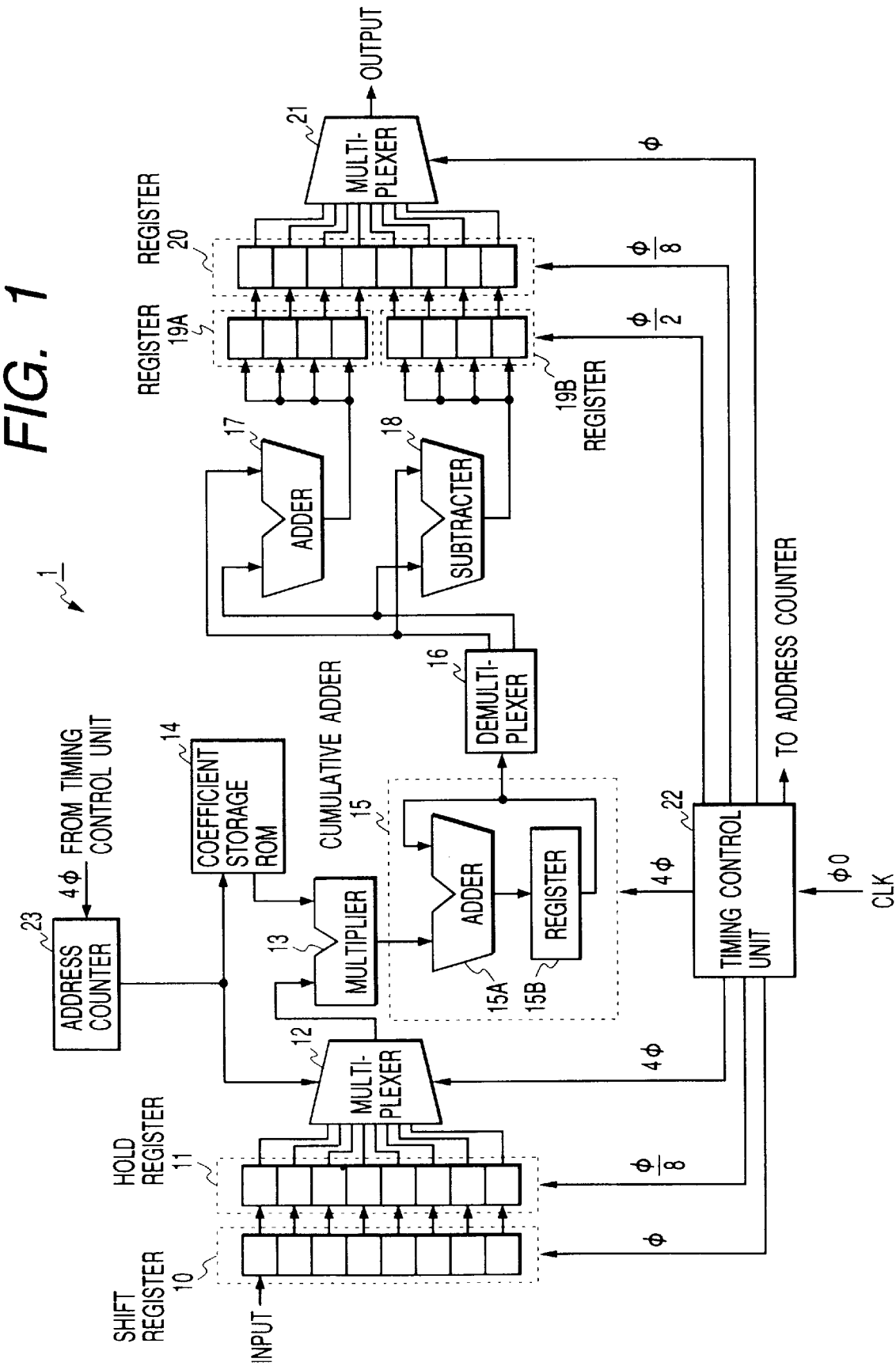
FIG. 1 is a block diagram showing a DCT operation circuit of a first embodiment schematically.

FIG. 1 is a block diagram showing a discrete cosine transformation (DCT) operation circuit of a first embodiment schematically. In this DCT operation circuit 1, input data are inputted through a shift register 10, a hold register 11 and a multiplexer 12 to a multiplier 13, and DCT transformation coefficients, read out of a coefficient storage ROM 14, are inputted to the multiplier 13, so that those input data and the DCT transformation coefficients are multiplied.

The results of multiplication are added by a cumulative adder 15 and are outputted through a demultiplexer 16 to an adder 17 and a subtracter 18, so that the output data, determined by the addition and subtraction, are outputted through registers 19A, 19B and 20 and a multiplexer 21.

An address counter 23 is connected with the multiplexer 12 and the coefficient storage ROM 14, the DCT transformation coefficient corresponding to an address designated by incrementing the address counter 23 is outputted from the coefficient storage ROM 14, and the data corresponding to the address are outputted from the hold register 11 by the multiplexer 12.

The input/output timings of the data in the individual registers 10, 11, 19A, 19B and 20, the multiplexers 12 and 21 and the cumulative adder 15 and the increment timing of the address counter 23 are controlled according to timing signals generated from a timing control unit 22. Here, FIG. 1 is a table prepared by using a reference clock CLK (frequency: φ0) inputted to the timing control unit 22 and the frequencies expressed using φ (φ is the frequency of the input timings of data to the shift register 10) of the timing signals outputted from the timing control unit 22 to the shift register 10, the hold register 11, the multiplexers 12 and 21, the cumulative adder 15, the registers 19A, 19B and 20 and the address counter 23.

This DCT operation circuit 1 produces two DCT operation results, when one column of data of an input matrix are inputted to the multiplier 13, by exploiting the regularity of the DCT transformation coefficients.

The regularity of the DCT transformation coefficients will be described at first.

For example, one-dimensional inverse DCT operations of 8×8 are expressed by a product of a matrix of the DCT transformation coefficients and an input coefficient matrix, as by Formula (1).

$$\begin{pmatrix} x0 \\ x1 \\ x2 \\ x3 \\ x4 \\ x5 \\ x6 \\ x7 \end{pmatrix} = \begin{pmatrix} d & a & b & c & d & e & f & g \\ d & c & f & -g & -d & -a & -b & -e \\ d & e & -f & -a & -d & g & b & c \\ d & g & -b & -e & d & c & -f & -a \\ d & -g & -b & e & d & -c & -f & a \\ d & -e & -f & a & -d & -g & b & -c \\ d & -c & f & g & -d & a & -b & e \\ d & -a & b & -c & d & -e & f & -g \end{pmatrix} \begin{pmatrix} X0 \\ X1 \\ X2 \\ X3 \\ X4 \\ X5 \\ X6 \\ X7 \end{pmatrix} \quad (1)$$

In this Formula, the 8×1 matrix on the lefthand side is the one-dimensional inverse DCT operation result, and the 8×8 matrix and the 8×1 matrix on the righthand side are the DCT transformation coefficients and the input data, respectively. Here, the coefficients a, b, c, d, e, f and g in the DCT transformation matrix are expressed as follows.

$a = \cos(\pi/16)/\sqrt{2}$
$b = \cos(2\pi/16)/\sqrt{2}$
$c = \cos(3\pi/16)/\sqrt{2}$
$d = \cos(4\pi/16)/\sqrt{2}$
$e = \cos(5\pi/16)/\sqrt{2}$
$f = \cos(6\pi/16)/\sqrt{2}$
$g = \cos(7\pi/16)/\sqrt{2}$ Formula (1) can be transformed into Formula (2). The DCT operation circuit 1 produces the one-dimensional inverse DCT operation results by using the regularity of Formula (2). Here in Formula (1) and Formula (2), only the first column of the 8×8 matrix is expressed for the input data and the output data, but the second to eighth columns are similar to the first column.

$$\begin{pmatrix} x0+x7 \\ x1+x6 \\ x2+x5 \\ x3+x4 \\ x0-x7 \\ x1-x6 \\ x3-x4 \\ x2-x5 \end{pmatrix} = 2 \begin{pmatrix} b & f & d & d & & & & \\ f & -b & d & -d & & & 0 & \\ -f & b & d & -d & & & & \\ -b & -f & d & d & & & & \\ & & & & a & c & e & g \\ & & 0 & & c & -g & -a & -e \\ & & & & g & -e & c & -a \\ & & & & e & -a & g & c \end{pmatrix} \begin{pmatrix} X2 \\ X6 \\ X0 \\ X4 \\ X1 \\ X3 \\ X5 \\ X7 \end{pmatrix} \quad (2)$$

Figure 2:
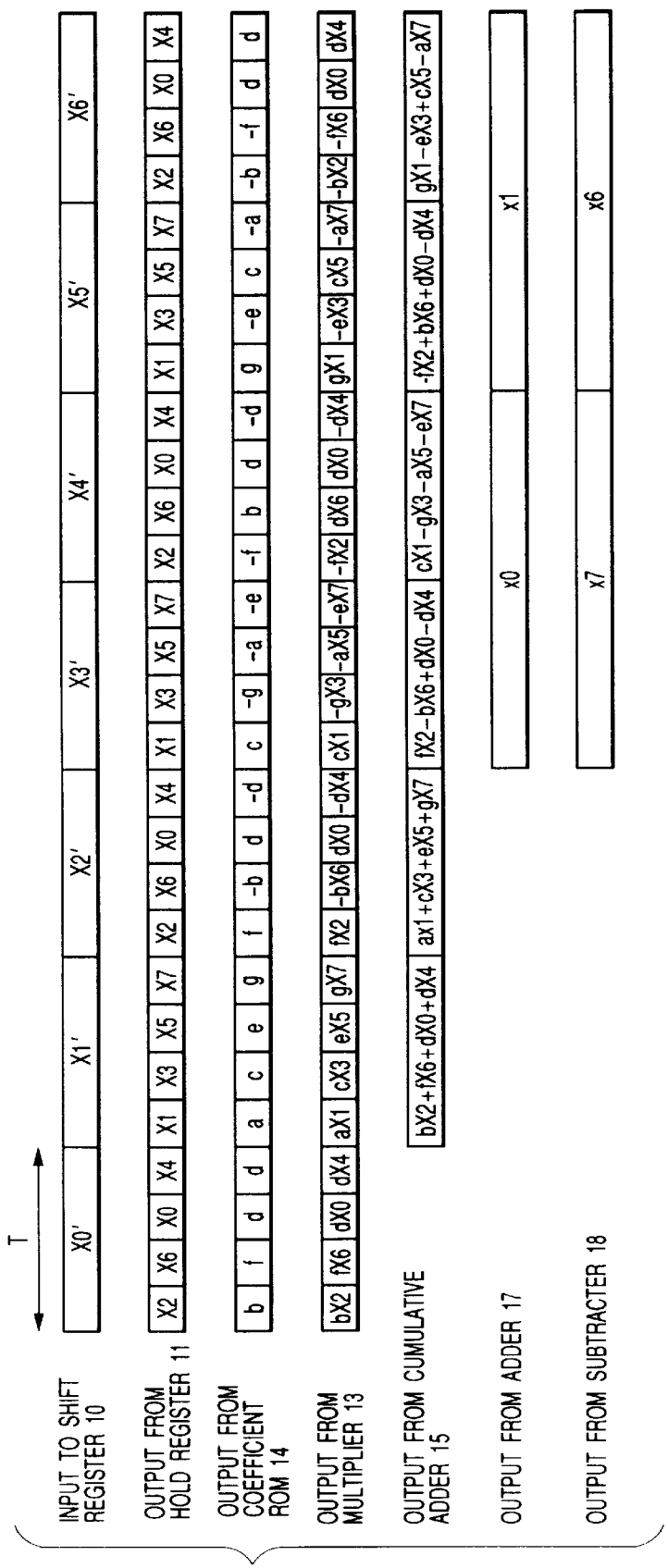
FIG. 2 is a time chart showing a part of the operation timings of the DCT operation circuit.

The DCT operation circuit 1 will be described in detail for the case of Formula (2), for example, with reference to the timing chart shown in FIG. 2. Here, input timings X0', X1', X2', X3', X4', X5' and X6' of the shift register 10 denote the data to be newly inputted to the shift register 10 while data X0, X1, X2, X3, X4, X5, X6 and X7 inputted at the immediately preceding cycle to the shift register 10, are subjected to the DCT transformation (this holds for FIGS. 4, 6 and 8).

The individual data (elements) X0, X1, X2, X3, X4, X5, X6 and X7 of the input data are sequentially inputted to the shift register 10. When these eight data are held in the shift register 10, they are transmitted from the shift register 10 to the hold register 11. Until the eight data of the next column are held in the shift register 10, the hold register 11 holds the eight data transmitted from the shift register 10. As a result, even if the data are consecutively inputted to the shift register 10, the data of one column can be held in the hold register 11.

The data fetching and shifting timings of the shift register 10 and the data fetching timings of the hold register 11 are controlled by the timing signals which are generated and outputted by the timing control unit 22. In the shift register 10, for example, the data are inputted and shifted at timings of a period T (frequency: $\phi$). The hold register 11 receives the data from the shift register 10 at timings of a period 8T (frequency: $\phi/8$).

The eight data held in the hold register 11 are sequentially selected by the multiplexer 12 according to the addresses designated by the address counter 23, so that they are transmitted to the multiplier 13. In synchronism with the inputs of the eight data, the multiplier 13 reads the DCT transformation coefficients corresponding to the addresses designated by the address counter 23 from the coefficient storage ROM 14, and performs the multiplication of the DCT transformation coefficients b, f, d, d, a, c, e and g and the data X2, X6, X0, X4, X1, X3, X5 and X7 sequentially transmitted from the multiplexer 12. The multiplication results bX2, fX6, dX0, dX4, aX1, cX3, eX5 and gX7 are sequentially transmitted to an adder 15A of the cumulative adder 15. Of the DCT transformation coefficients thus read out, the four coefficients of the first half are the elements of the first to fourth columns of the first row of Formula (2), and the four coefficients of the second half are the elements of the fifth to eighth columns of the fifth row of Formula (2).

The inputting timings of the data to be inputted from the multiplexer 12 to the multiplier 13 is controlled by the timing signal generated by and outputted from the timing control unit 22, and they are timings (frequency: 4$\phi$) of a quarter of the aforementioned input period T of the data inputted to the shift register 10 (frequency: 4$\phi$). Moreover, the multiplication results are sequentially transmitted at timings of a quarter of T of (T/4) (frequency: 4$\phi$) from the multiplier 13 to the cumulative adder 15. As a result, the product of the number of the multipliers and the normalized frequency in the first embodiment is [1×4=4].

The cumulative adder 15 comprises of the adder 15A and a register 15B and cumulatively adds the four multiplication results bX2, fX6, dX0 and dX4 of the first half inputted from the multiplier 13. Specifically, the first multiplication result bX2 is temporarily held in the register 15B. In synchronism with the next multiplication result fX6 inputted from the multiplier 13, the multiplication result bX2 is transmitted from the register 15B to the adder 15A, in which the addition of [bX2+fX6] is effected, and this addition result is temporarily held again in the register 15B. Like this, for the individual multiplication results dX0 and dX4, the multiplication result dX0 is added to the sum [bX2+fX6] temporarily held in the register 15B, and the addition result [bX2+fX6+dX0] is temporarily held in the register 15B. The multiplication result dX4 is further added to obtain [bX2+fX6+dX0+dX4]. This cumulative addition result obtained by adding the four multiplication results is transmitted to the demultiplexer 16, so that it is distributed and inputted to the adder 17 and the subtracter 18.

The four multiplication results aX1, cX3, eX5 and gX7 of the second half inputted from the multiplier 13 are likewise cumulatively added by the cumulative adder 15. The cumulative addition result [aX1+cX3+eX5+gX7] thus obtained is transmitted to the demultiplexer 16, so that it is distributed and inputted to the adder 17 and the subtracter 18.

The outputting timings from the cumulative adder 15 to the demultiplexer 16 are controlled by the timing signals generated by and outputted from the timing control unit 22, and are identical to the input period T (frequency: $\phi$) of the input data.

The adder 17 and the subtracter 18 respectively adds and subtracts the two inputted cumulative addition results [bX2+fX6+dX0+dx4] and [aX1+cX3+eX5+gX7]. More specifically, the results of the cumulative adder 15 are individually inputted in sets of two to the adder 17 and the subtracter 18, so that the adder 17 determines their sum whereas the subtracter 18 sequentially determines the differences of the first input values from the next input values, that is, the differences of the values inputted n-th (n is an odd number) from the values inputted m-th (m is an even number). Here, as apparent from Formula (2), the double of the first cumulative addition result [bX2+fX6+dX0 and dX4] and the double of the second cumulative addition result [aX1+cX3+eX5+gX7] are equal to the sum [x0+x7] and the difference [x0−x7], which are the elements of the output data (the inverse DCT operation results), respectively. As a result, the element x0 is obtained from the adder 17, and the element x7 is obtained from the subtracter 18. These two operation results x0 and x7 are simultaneously stored at the double period (2T) of the input period T of the input data in the registers 19A and 19B.

Such operations are also performed for the combinations of the elements of the first to fourth columns of the second row of the DCT transformation matrix of Formula (2) and the elements of the fifth to eighth columns of the sixth row, the combinations of the elements of the first to fourth columns of the third row and the elements of the fifth to eighth columns of the seventh row, and the combinations of the elements of the first to fourth columns of the fourth row and the elements of the fifth to eighth columns of the eighth row, so that the elements x0, x7, x1, x6, x2, x5, x3 and x4 of the first column of the output data are obtained.

As a result, the register 19A holds the elements x0, x1, x2 and x3 of the output data outputted from the adder 17. The register 19B holds the elements x7, x6, x5 and x4 of the output data outputted from the subtracter 18. The eight data (elements) of the first column of the data are transmitted, when held in the registers 19A and 19B, from the registers 19A and 19B to the register 20. Until the register 20 holds the eight data of the next column, it holds the eight data transmitted from the registers 19A and 19B. Here, the transmission timings of the data from the adder 17 and the subtracter 18 to the registers 19A and 19B are controlled by the timing signals generated by and outputted from the timing control unit 22, at a period (2T) twice the input period T of the input data. Moreover, the data transmissions from the registers 19A and 19B to the register 20 are performed in a cycle of 8T (frequency: φ/8).

The individual elements x0, x1, x2, x3, x4, x5, x6 and x7 of the output data held in the register 20 are sequentially selected by the multiplexer 21 and outputted at timings of the period T (frequency: φ). As a result, for the elements X0, X1, X2, X3, X4, X5, X6 and X7 of the first column of the input data inputted for the period T (frequency: φ) to the DCT operation circuit 1, there are sequentially outputted in a cycle of T (frequency: φ) the individual elements x0, x1, x2, x3, x4, x5, x6 and x7 of the first column of the one-dimensional (inverse) DCT operation result.

By repeating the aforementioned operations from the second to eighth columns of the input data, it is possible to obtain the one-dimensional (inverse) DCT operation results of 8×8.

Figure 3:
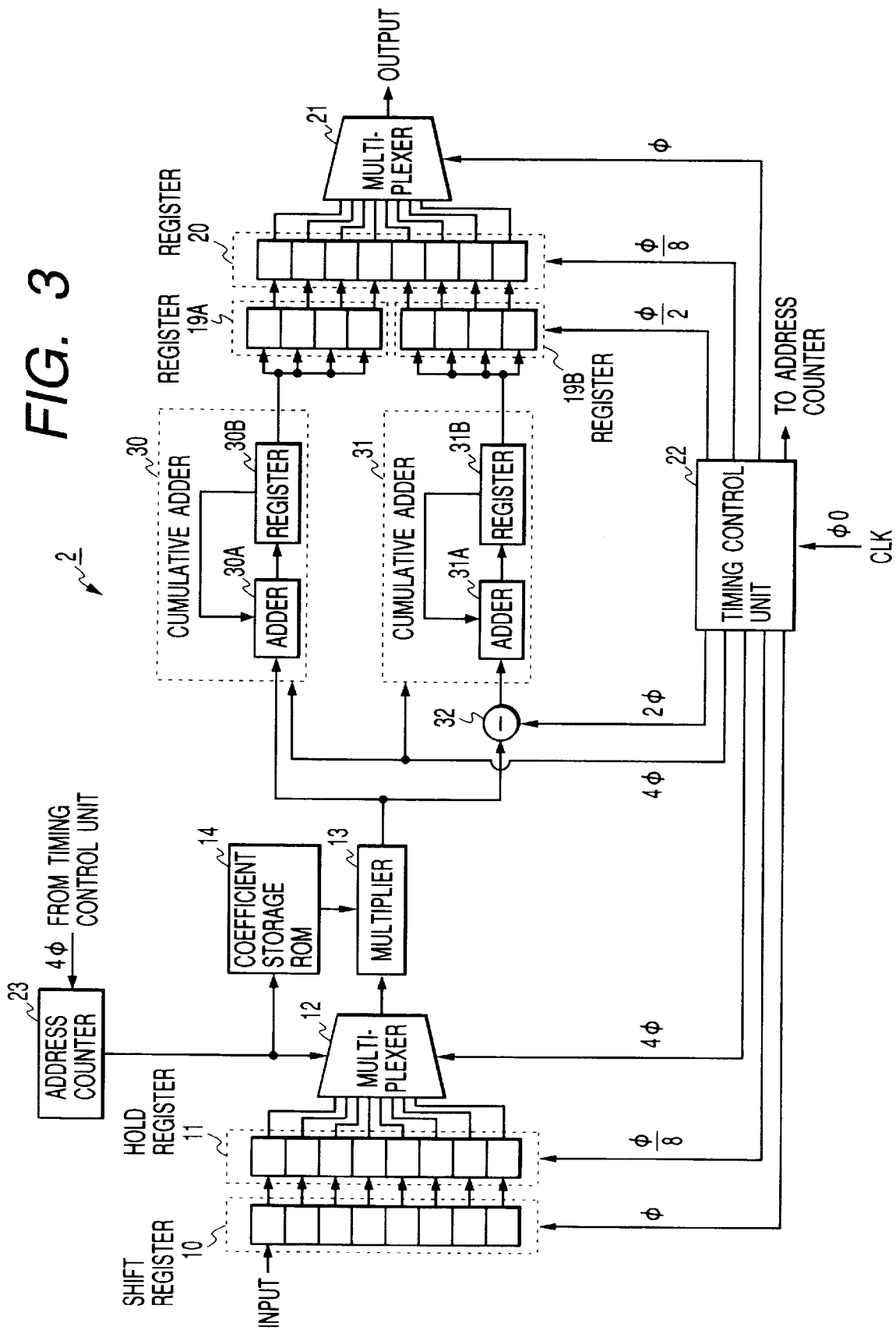
FIG. 3 is a block diagram showing a DCT operation circuit of a second embodiment schematically.

FIG. 3 is a block diagram schematically showing a DCT operation circuit of a second embodiment according to the invention. In a DCT operation circuit 2 of this second embodiment, as in the DCT operation circuit 1 of the foregoing first embodiment, the data inputted through the shift register 10, the hold register 11 and the multiplexer 12, and the DCT transformation coefficients read out from the coefficient storage ROM 14 are multiplied in the multiplier 13. The combination of the input data and the DCT transformation coefficients to be multiplied is selected by the address counter 23 which is connected with the multiplexer 12 and the coefficient storage ROM 14. Moreover, the output data determined by adding the multiplication results by two cumulative adders 30 and 31 are outputted through the registers 19A, 19B and 20 and the multiplexer 21. Here, in one cumulative adder (a first cumulative adder) 30, the multiplication results sequentially inputted from the adder 13 are added as they are. In the other cumulative adder (a second cumulative adder) 31, the multiplication results sequentially inputted from the adder 13 are added after the sign of every other result is inverted by a sign inverter 32.

The input/output timings of the data in the individual registers 10, 11, 19A, 19B and 20, the multiplexers 12 and 21 and the cumulative adders 30 and 31, the sign inverting timings of the sign inverter 32, and the increment timing of the address counter 23 are controlled according to the timing signals generated from a timing control unit 22. Here, FIG. 3 is a table prepared by using a reference clock CLK (frequency: φ0) inputted to the timing control unit 22; and the frequencies expressed by using φ (φ is the frequency of the input timings of data to the shift register 10) of the timing signals outputted from the timing control unit 22 to the shift register 10, the hold register 11, the multiplexers 12 and 21, the cumulative adders 30 and 31, the sign inverter 32, the registers 19A, 19B and 20 and the address counter 23.

This DCT operation circuit 2 produces two DCT operation results, when one column of data of an input matrix are inputted to the multiplier 13, by exploiting the regularity of the DCT transformation coefficients expressed by Formula (1).

Figure 4:
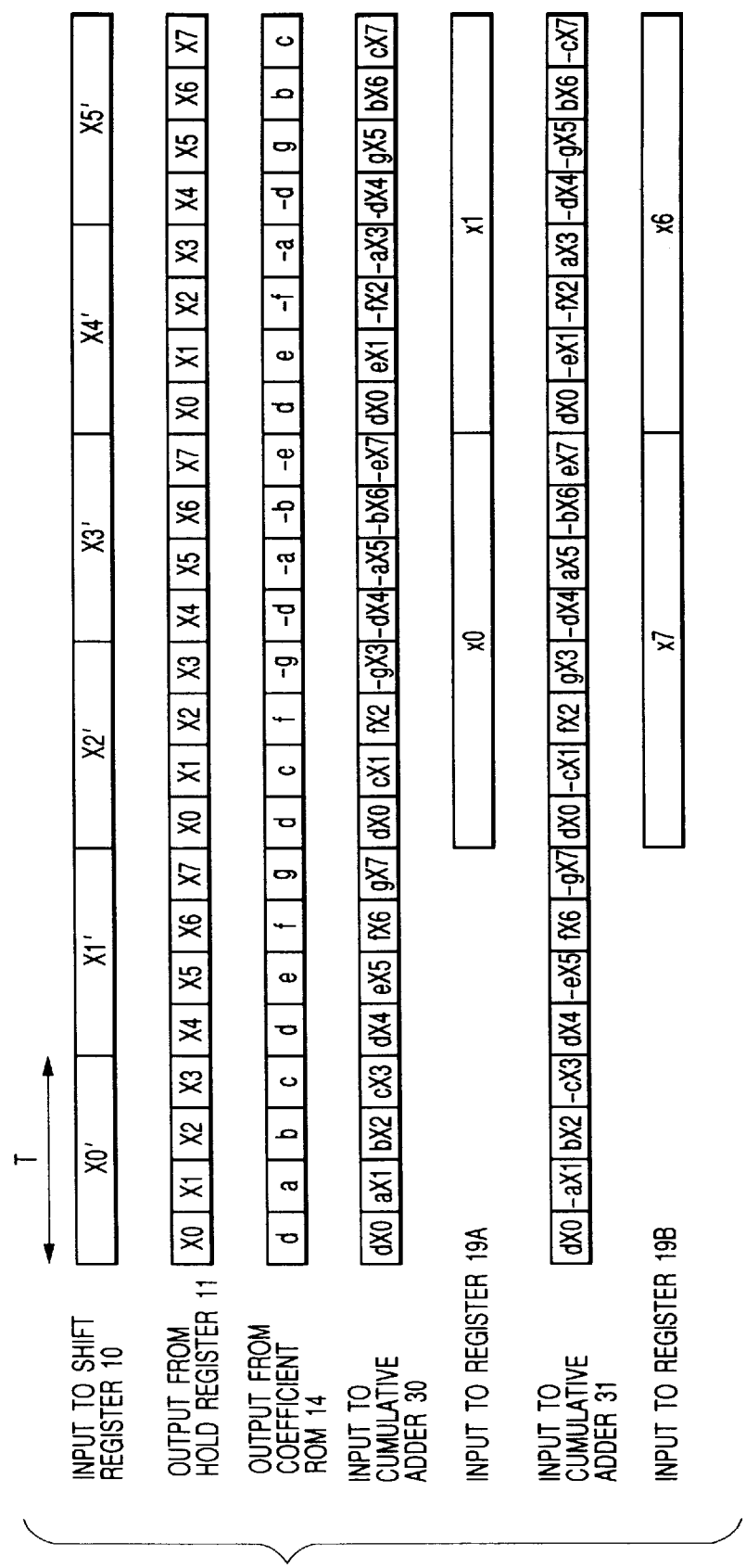
FIG. 4 is a time chart showing a part of the operation timings of the DCT operation circuit.

The DCT operation circuit 2 will be described in detail for the case of Formula (1), for example, with reference to the timing chart shown in FIG. 4.

The descriptions of the shift register 10, the hold register 11, the multiplexers 12 and 21, the coefficient storage ROM 14, the multiplier 13, the registers 19A, 19B and 20, the timing control unit 22 and the address counter 23 will be omitted by designating them by the same reference numerals because of the similar construction to the first embodiment.

The individual data (or elements) X0, X1, X2, x3, X4, X5, X6 and X7 of the input data are sequentially inputted at timings of T/4 (frequency: 4φ) to the multiplier 13 through the shift register 10, the hold register 11 and the multiplexer 12. In synchronism with the input timings of the data X1, X1, X2, X3, X4, X5, X6 and X7, the DCT transformation coefficients d, a, b, c, d, e, f and g of the first row of Formula (1) are sequentially inputted to the multiplier 13 from the coefficient storage ROM 14.

The individual multiplication results dX0, aX1, bX2, cX3, dX4, eX5, fX6 and gX7 obtained by the multiplications in the multiplier 13 are sequentially transmitted at timings of T/4 (frequency: 4φ) to an adder 30A of the first cumulative adder 30, and further to an adder 31A of the second cumulative adder 31 after the sign of every other result are inverted by the sign inverter 32. By the adders 30A and 31A and registers 30B and 31B of the individual cumulative adders 30 and 31, moreover, the eight multiplication results are added to obtain [dX0+aX1+bX2+cX3+dX4+eX5+fX6+gX7] from the first cumulative adder 30 and [dX0−aX1+bX2−cX3+dX4−eX5+fX6−gX7] from the second cumulative adder 31. Here, the accumulative additions are similar to those in the cumulative adder 15 of the foregoing first embodiment excepting that the number of cumulative additions is seven.

As apparent from Formula (1), the first cumulative adder result [dX0+aX1+bX2+cX3+dX4+eX5+fX6+gX7] and the second cumulative adder result [dX0−aX1+bX2−cX3+dX4−eX5+fX6−gX7] are equal to the elements x0 and x7 of the output data (the inverse DCT operation results), respectively. As a result, the element x0 is obtained from the first cumulative adder 30, and the element x7 is obtained from the second cumulative adder 31. These two operation results x0 and x7 are stored in the registers 19A and 19B.

By performing such operations for the second to fourth rows (the seven to fifth rows) of the DCT transformation matrix of Formula (1), there are obtained the elements x0, x1, x2, x3, x4, x5, x6 and x7 of the first column of the output data. The eight data (elements) of the first column of the output data are transmitted, when held in the registers 19A and 19B, to the register 20, so that they are sequentially selected by and outputted from the multiplexer 21. As a result, for the elements X0, X1, X2, X3, X4, X5, X6 and X7 of the first column of the input data inputted for the period T (frequency: φ) to the DCT operation circuit 1, the elements x0, x1, x2, x3, x4, x5, x6 and x7 of the first column of the one-dimensional inverse DCT operation results are sequentially outputted in a cycle of the period T (frequency: φ).

By repeating the aforementioned operations for the second to eighth columns of the input data, it is possible to obtain the one-dimensional DCT operation results of 8×8.

Here, the data and the DCT transformation coefficients are inputted to the multiplier 13 at timings of a quarter (T/4) of the input period T of the data (frequency: 4φ) inputted to the shift register 10. The multiplication results are sequentially transmitted at timings of a quarter (T/4) of the period T (frequency: 4φ) from the multiplier 13 to the cumulative adders 30 and 31. Therefore, the product of the number of multipliers and the normalized frequency in this second embodiment is [1×4=4]. The cumulative addition results are outputted at timings of 2T (frequency: φ/2) from the cumulative adders 30 and 31 to the registers 19A and 19B. The timing control unit 22 generates the sign inverting signals at timings of T/2 (frequency: 2φ) and outputs them to the sign inverter 32. As a result, the sign of every other multiplication results out of the results inputted in a cycle of T/4 (frequency: 4φ) to the cumulative adder 31 is alternately inverted.

Figure 5:
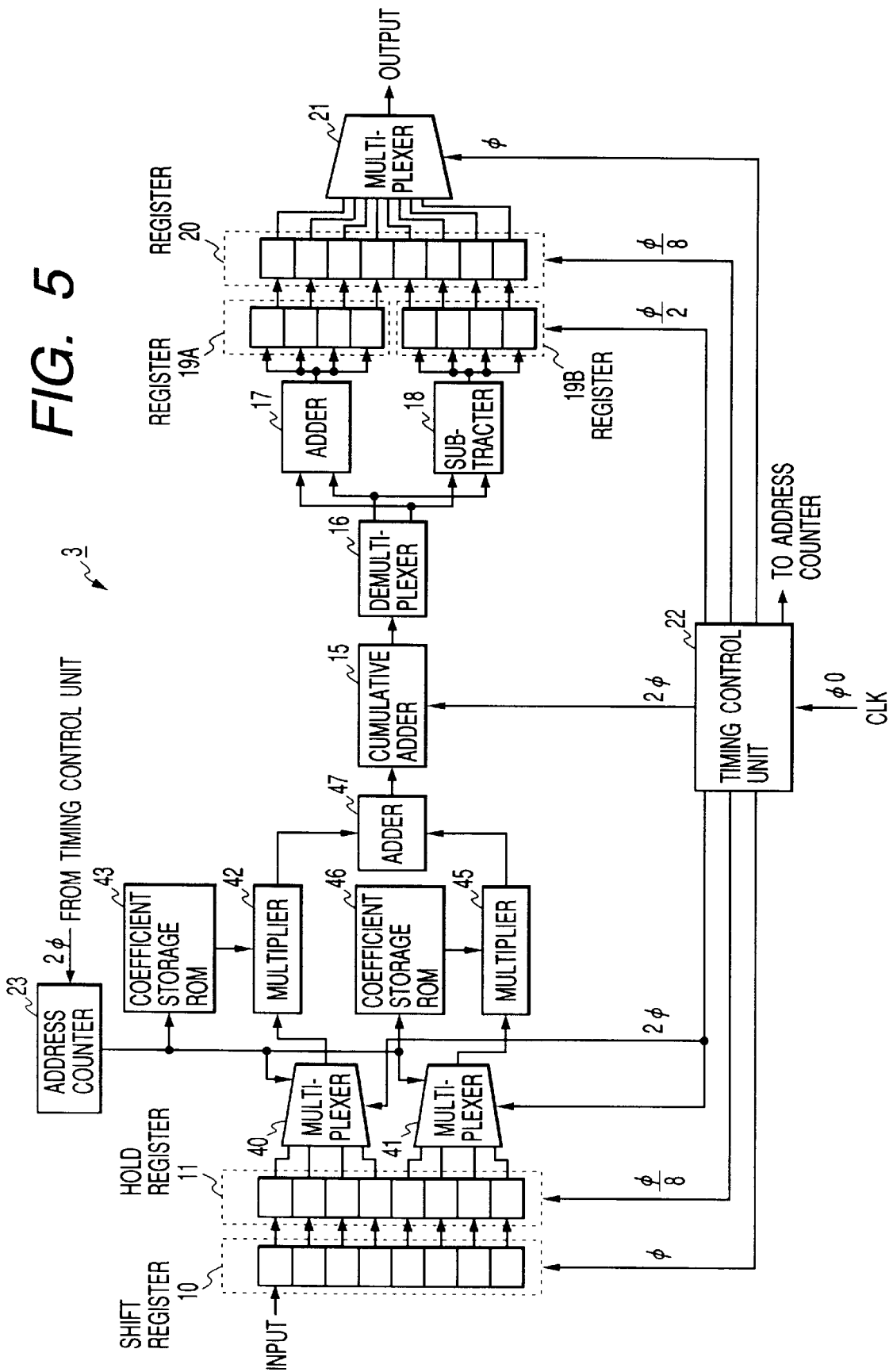
FIG. 5 is a block diagram showing a DCT operation circuit of a third embodiment schematically.

FIG. 5 is a block diagram showing a third embodiment of the DCT operation circuit according to the invention. In a DCT operation circuit 3 of this third embodiment, a pair of multiplexers 40 and 41 are connected with the hold register 11 for holding, for example, eight data inputted through the shift register 10; multipliers 42 and 45 are connected with the multiplexers 40 and 41, respectively; and coefficient storage ROMs 43 and 46 are connected with the multipliers 42 and 45, respectively. Although the number is not especially limited, the thirty two DCT transformation coefficients (excepting "0") of Formula (2), for example, are divided into two groups, so that sixteen coefficients are stored in each of the coefficient storage ROMs 43 and 46.

In the multiplier 42, moreover, the data inputted from the shift register 10, the hold register 11 and the multiplexer 40, and the DCT transformation coefficients read out of the coefficient storage ROM 43 are multiplied. In the multiplier 45, the data inputted through the hold register 11 and the multiplexer 41, and the DCT transformation coefficients read out of the coefficient storage ROM 46 are multiplied. These operations in the multipliers 42 and 45 are processed in parallel. The combinations, multiplied in the individual multipliers 42 and 45, of the input data and the DCT transformation coefficient are selected by the address counter 23 which is commonly connected with the multiplexers 40 and 41 and the coefficient storage ROMs 43 and 46.

An adder 47 is connected with the multipliers 42 and 45, and it adds the multiplication results outputted from the multipliers 42 and 45. With the adder 47, there is connected the cumulative adder 15 which further adds the two addition results consecutively outputted from the adder 47.

The addition result outputted from the cumulative adder 15 is outputted, as in the DCT operation circuit 1 of the foregoing first embodiment, through the demultiplexer 16 to the adder 17 and the subtracter 18, and the output data determined by the addition and the subtraction are outputted through the registers 19A, 19B and 20 and the multiplexer 21.

The input/output timings of the data in the individual registers 10, 11, 19A, 19B and 20, the multiplexers 40, 41 and 21 and the cumulative adder 15, and the increment timings of the address counter 23 are controlled according to the timing signals generated from the timing control unit 22. Here, FIG. 5 is a table prepared by using a reference clock CLK (frequency φ0) inputted to the timing control unit 22, and the frequencies expressed using φ (the frequencies of the input timings of data to the shift register 10) of the timing signals outputted from the timing control unit 22 to the shift register 10, the hold register 11, the multiplexers 40, 41 and 21, the cumulative adder 15, the registers 19A, 19B and 20 and the address counter 23.

This DCT operation circuit 3 produces two DCT operation results, when half data of one column in an input matrix are inputted to the multiplier 42 and when the other half data of one column in the input matrix are inputted to the multiplier 45, by exploiting the regularity of the DCT transformation coefficients expressed by Formula (2).

Figure 6:
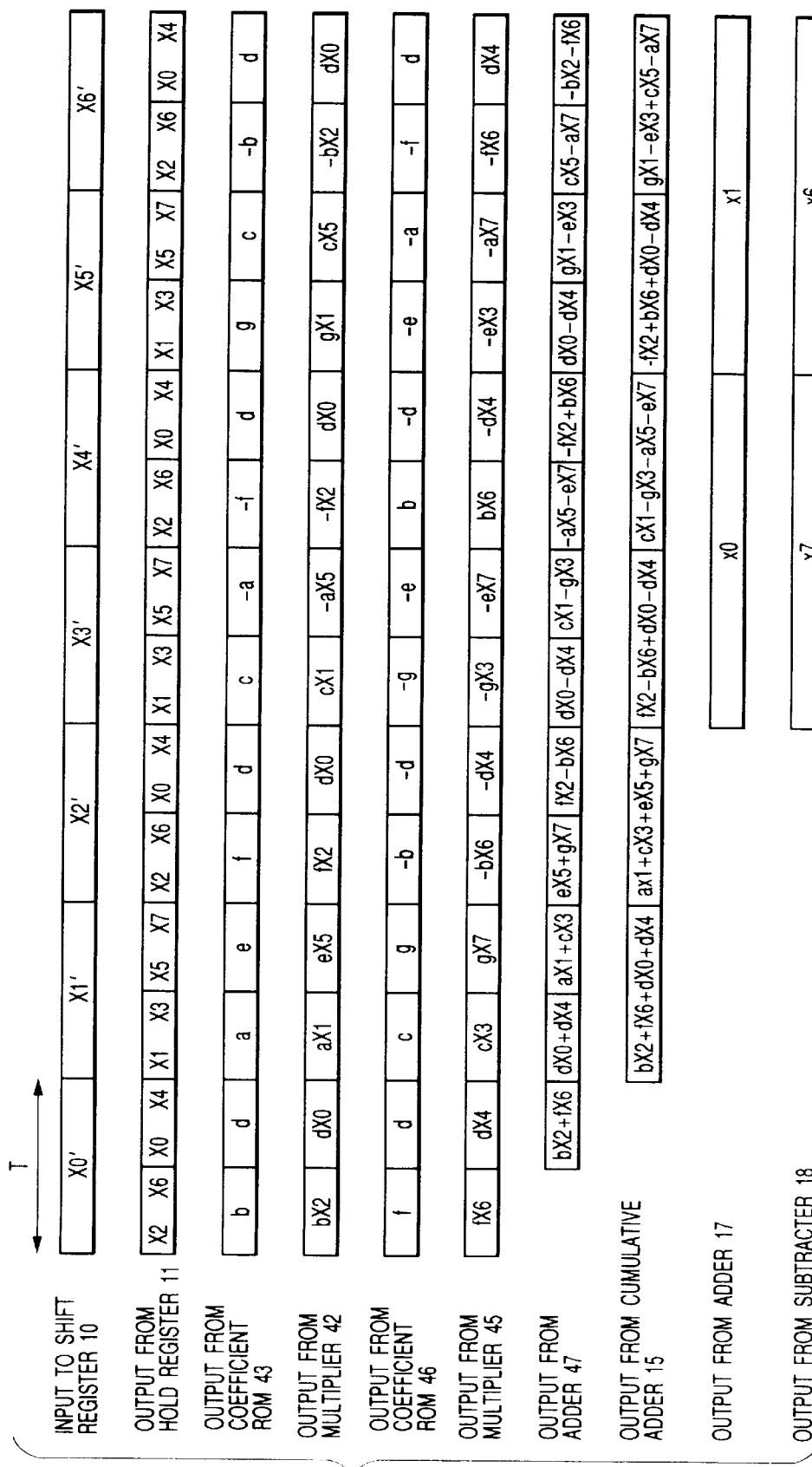
FIG. 6 is a time chart showing a part of the operation timings of the DCT operation circuit.

The DCT operation circuit 3 will be described in detail for the case of Formula (2), for example, with reference to the timing chart shown in FIG. 6.

The descriptions of the shift register 10, the hold register 11, the cumulative adder 15, the demultiplexer 16, the adder 17, the subtracter 18, the registers 19A, 19B and 20, the multiplexer 21, the timing control unit 22 and the address counter 23 will be omitted by designating them by the same reference numerals because of the similar construction to the foregoing first embodiment.

Half (four) data X2, X0, X1 and X5 of the eight data inputted through the shift register 10 and held in the hold register 11 are sequentially selected and transmitted to the multiplier 42 by the multiplexer 40 on the basis of the addresses designated by the address counter 23. In synchronism with the individual transfer timings of those data X2, X0, X1 and X5, the other four data X6, X4, X3 and X7 of the hold register 11 are sequentially selected and transmitted to the multiplier 45 by the multiplexer 41 on the basis of the address designation of the address counter 23.

In synchronism with the inputs of the four data, the multiplier 42 sequentially reads out the DCT transformation coefficients corresponding to the addresses designated by the address counter 23, from the coefficient storage ROM 43, and operates the multiplications of the DCT transformation coefficients b, d, a and e (of which b and d are the DCT transformation coefficients of the first and third columns of the first row of Formula (2), and a and e are the DCT transformation coefficients of the fifth and seventh columns of the fifth row of Formula (2)) and the data X2, X0, X1 and X5 sequentially transmitted from the multiplexer 40. In synchronism with the inputs of the four data, the multiplier 45 sequentially reads out the DCT transformation coefficients corresponding to the addresses designated by the address counter 23, from the coefficient storage ROM 46, and operates the multiplications of the DCT transformation coefficients f, d, c and g (of which f and d are the DCT transformation coefficients of the second and fourth columns of the first row of Formula (2), and c and g are the DCT transformation coefficients of the sixth and eight columns of the fifth row of Formula (2)) and the data X6, X4, X3 and X7 sequentially transmitted from the multiplexer 41.

The inputting timings of the data inputted from the multiplexers 40 and 41 to the multipliers 42 and 45 are controlled by the timing signals generated by and outputted from the timing control unit 22, and they are timings of one-half (T/2) of the input period T of the data inputted to the shift register 10 (frequency: 2φ). In short, the operating frequency of the multipliers 42 and 45 is 2φ. As a result, the product of the number of multipliers and the normalized frequency in this third embodiment is [2×2=4].

The multiplication results bX2 and fX6, dX0 and dX4, aX1 and cX3, and eX5 and gX7 are in pairs inputted to the adder 47 synchronously from the multiplier 42 and the multiplier 45. Then, the adder 47 performs additions to output [bX2+fX6], [dX0+dX4], [aX1+cX3) and [eX5+gX7] sequentially to the cumulative adder 15. The input/output timings of the data of the adder 47 are controlled at timings of T/2 (frequency: 2φ) by the timing signals generated by and outputted from the timing control unit 22.

The cumulative adder 15 cumulatively adds the two multiplication results [bX2+fX6] and [dX0+dX4] of the first half inputted from the adder 47. The operation result [bX2+fX6+dX0+dX4] are transmitted to the demultiplexer 16, and distributed and inputted to the adder 17 and the subtracter 18. The two multiplication results [aX1+cX3] and [eX5+gX7] of the second half inputted from the adder 47 are also added by the cumulative adder 15, so that the operation result [aX1+cX3+eX5+gX7] is fed to the demultiplexer 16, and distributed and inputted to the adder 17 and the subtracter 18.

The outputting timings from the cumulative adder 15 to the demultiplexer 16 are controlled by the timing signal generated by and outputted from the timing control unit 22, and are timings of T/2 (frequency: 2φ).

The two cumulative addition results inputted to the adder 17 and the subtracter 18, are then processed as in the foregoing first embodiment through the adder 17, the subtracter 18 and the registers 19A, 19B and 20, and outputted as the output data (the inverse DCT operation results) from the multiplexer 21.

Such operations are also performed for the combinations of the elements of the first to fourth columns of the second row of the DCT transformation matrix of Formula (2) and the elements of the fifth to eighth columns of the sixth row, the combinations of the elements of the first to fourth columns of the third row and the elements of the fifth to eighth columns of the seventh row, and the combinations of the elements of the first to fourth columns of the fourth row and the elements of the fifth to eighth columns of the eighth row, and the elements x0, x7, x1, x6, x2, x5, x3 and x4 of the first column of the output data are obtained.

By repeating the aforementioned operations from the second to eighth columns of the input data, it is possible to obtain the one-dimensional DCT operation results of 8×8.

Figure 7:
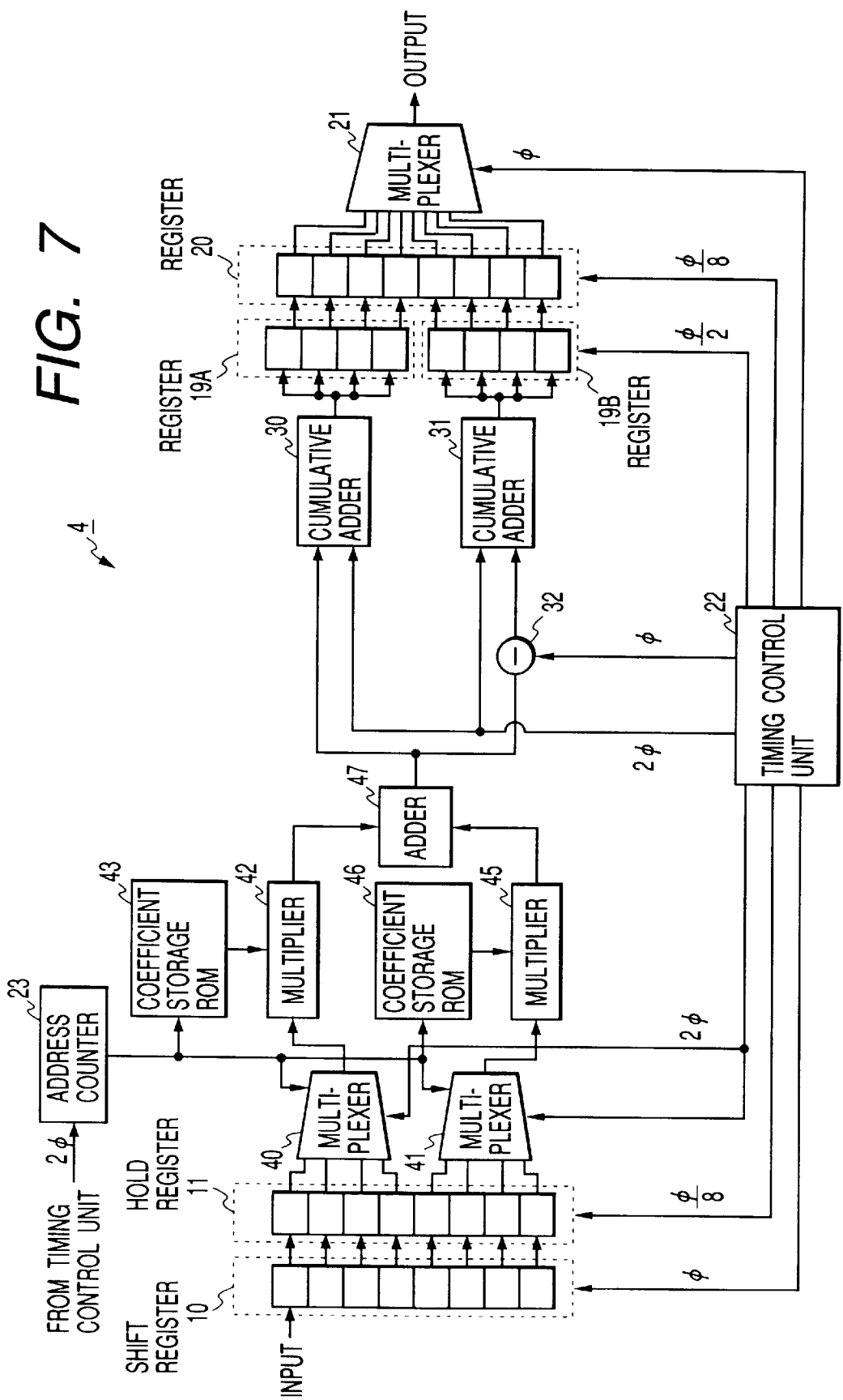
FIG. 7 is a block diagram showing a DCT operation circuit of a fourth embodiment schematically.

FIG. 7 is a block diagram showing a fourth embodiment of the DCT operation circuit according to the invention. In a DCT operation circuit 4 of this fourth embodiment, a pair of multiplexers 40 and 41 are connected with the hold register 11 for holding, e.g., eight data inputted through the shift register 10; multipliers 42 and 45 are connected with the multiplexers 40 and 41, respectively; and coefficient storage ROMs 43 and 46 are connected with the multipliers 42 and 45, respectively. Although the number is not especially limited, the sixty four DCT transformation coefficients of Formula (1), for example, are divided into two groups, so that thirty two DCT transformation coefficients are stored in each of the coefficient storage ROMs 43 and 46.

In the multiplier 42, moreover, the data inputted from the shift register 10, the hold register 11 and the multiplexer 40, and the DCT transformation coefficients read out of the coefficient storage ROM 43 are multiplied. In the multiplier 45, the data inputted through the shift register 10, the hold register 11 and the multiplexer 41, and the DCT transformation coefficients read out of the coefficient storage ROM 46 are multiplied. These operations in the multipliers 42 and 45 are processed in parallel. The combinations, multiplied in the multipliers 42 and 45, of the input data and the DCT transformation coefficient are selected by the address counter 23 which is commonly connected with the multiplexers 40 and 41 and the coefficient storage ROMs 43 and 46.

An adder 47 is connected with the multipliers 42 and 45, and it adds the multiplication results outputted from the multipliers 42 and 45. The cumulative adder 30 is connected with the adder 47, and the cumulative adder 31 is connected with the adder 47 through the sign inverter 32.

The four addition results consecutively outputted from the adder 47 are added as they are in the cumulative adder 30, and added in the cumulative adder 31 after the sign of every other result is inverted by the sign inverter 32. The output data determined by the two cumulative adders 30 and 31 are outputted through the registers 19A, 19B and 20 and the multiplexer 21.

The input/output timings of the data of the registers 10, 11, 19A, 19B and 20, the multiplexers 40, 41 and 21 and the cumulative adders 30 and 31, the sign inverting timings of the sign inverter 32, and the increment timings of the address counter 23 are controlled by the timing signals generated from the timing control unit 22. Here, FIG. 7 is a table prepared by using a reference clock CLK (frequency φ0) inputted to the timing control unit 22, and the frequencies expressed using φ (the frequencies of the input timings of data to the shift register 10) of the timing signals outputted from the timing control unit 22 to the shift register 10, the hold register 11, the multiplexers 40, 41 and 21, the cumulative adders 30 and 31, the sign inverter 32, the registers 19A, 19B and 20 and the address counter 23.

This DCT operation circuit 4 produces two DCT operation results, when one-half data of one column in an input matrix are inputted to the multiplier 42 and when the other half data of one column in the input matrix are inputted to the multiplier 45, by exploiting the regularity of the DCT transformation coefficients expressed by Formula (1).

Figure 8:
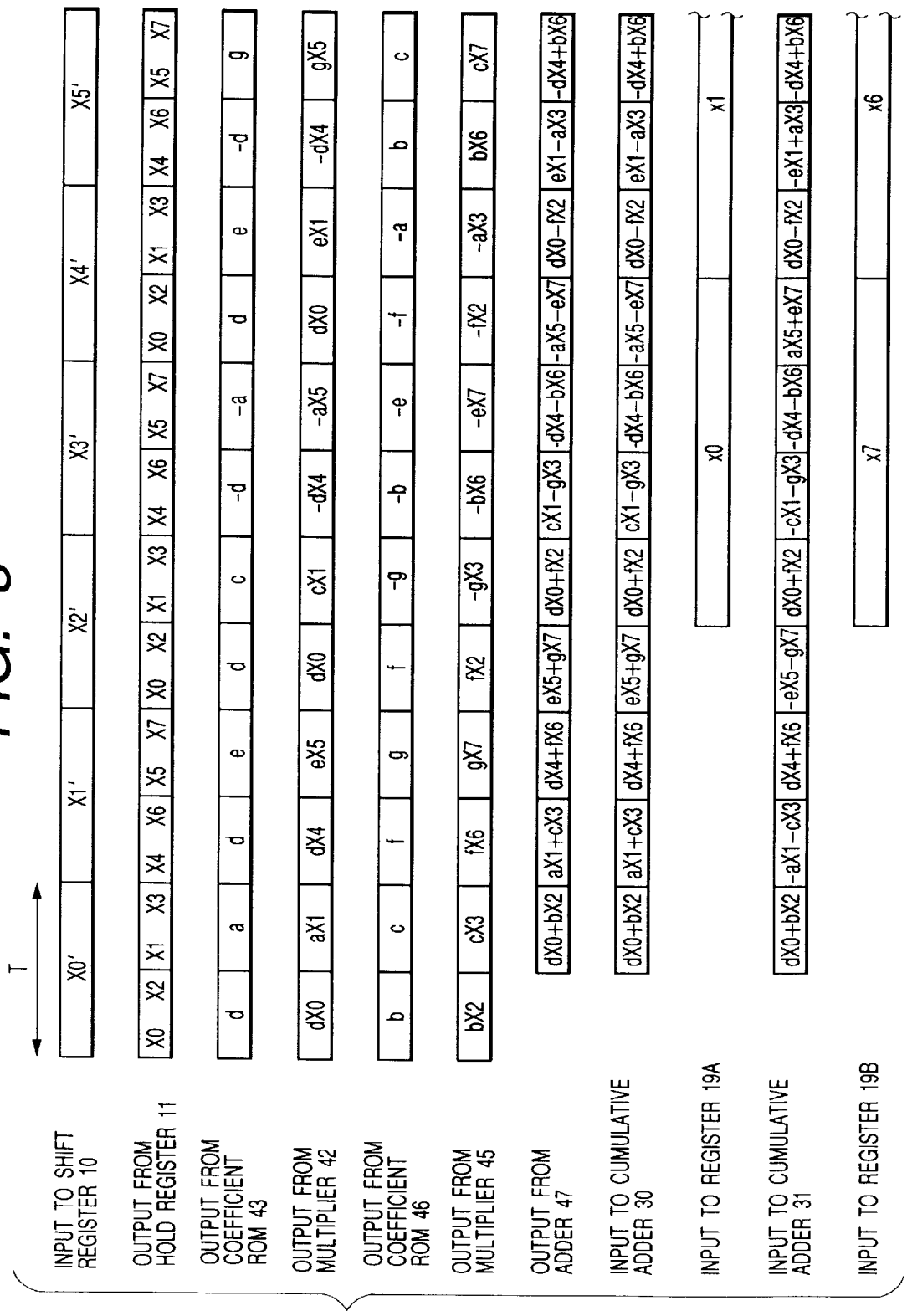
FIG. 8 is a time chart showing a part of the operation timings of the DCT operation circuit.

The DCT operation circuit 4 will be described in detail for the case of Formula (1), for example, with reference to a timing chart shown in FIG. 8.

The descriptions of the shift register 10, the hold register 11, the registers 19A, 19B and 20, the multiplexer 21 and the timing control unit 22 will be omitted by designating them by the same reference numerals because of the similar construction to the foregoing first embodiment. Moreover, the descriptions of the cumulative adders 30 and 31, the sign inverter 32 and the address counter 23 will be omitted by designating them by the same reference numerals because of the similar construction to the foregoing second embodiment.

Half (four) data X0, X1, X4 and X5 out of the eight data inputted through the shift register 10 and held in the hold register 11 are sequentially selected and transmitted to the multiplier 42 by the multiplexer 40 on the basis of the addresses designated by the address counter 23. In synchronism with the individual transfer timings of those data X0, X1, X4 and X5, the other four data X2, X3, X6 and X7 of the hold register 11 are sequentially selected and transmitted to the multiplier 45 by the multiplexer 41 on the basis of the address designation of the address counter 23.

In synchronism with the inputs of the four data, the multiplier 42 sequentially reads out the DCT transformation coefficients corresponding to the addresses designated by the address counter 23 from the coefficient storage ROM 43, and operates the multiplications of the DCT transformation coefficients d, a, d and e (which are in this order the DCT transformation coefficients of the first, second, fifth and sixth columns of the first row of Formula (1)) and the data X0, X1, X4 and X5 sequentially transmitted from the multiplexer 40. In synchronism with the inputs of the four data, the multiplier 45 sequentially reads out the DCT transformation coefficients corresponding to the addresses designated by the address counter 23 from the coefficient storage ROM 46, and operates the multiplications of the DCT transformation coefficients b, c, f and g (which are in this order the DCT transformation coefficients of the third, fourth, seventh and eighth columns of the first row of Formula (1)) and the data X2, X3, X6 and X7 sequentially transmitted from the multiplexer 41.

The inputting timings of the data individually inputted from the multiplexers 40 and 41 to the multipliers 42 and 45 are controlled by the timing signals generated by and outputted from the timing control unit 22, and are the timings of one-half (T/2) of the input period T of the data inputted to the shift register 10 (frequency: 2φ). In short, the operating frequency of the multipliers 42 and 45 is 2φ. As a result, the product of the number of multipliers and the normalized frequency in this fourth embodiment is [2×2=4].

The multiplication results dX0 and bX2, aX1 and cX3, dX4 and fX6, and eX5 and gX7 are in pairs inputted to the adder 47 synchronously from the multiplier 42 and the multiplier 45. Then, the adder 47 performs additions to output [dX0+bX2], [aX1+cX3], [dX4+fX6] and [eX5+gX7] sequentially. The input/output of the data of the adder 47 are controlled at timings of one-half (T/2) of the input period T of the data inputted to the shift register 10 (frequency: 2ϕ) by the timing signals generated by and outputted from the timing control unit 22.

The addition results outputted from the adder 47 are transmitted to the one cumulative adder 30 and through the sign inverter 32 to the other cumulative adder 31. The cumulative adder 30 cumulatively adds the four addition results sequentially transmitted from the adder 47, and outputs the result [dX0+bX2+aX1+cX3+dX4+fX6+eX5+gX7] to the register 19A. The sign of every other addition result out of the four addition results sequentially transmitted from the adder 47 is inverted by the sign inverter 32. The cumulative adder 31 cumulatively adds the four addition results, and outputs the result [dX0+bX2−aX1−cX3+dX4+fX6−eX5−gX7] to the register 19B.

These two cumulative addition results inputted to the registers 19A and 19B are processed as in the foregoing second embodiment and outputted as the output data (the inverse DCT operation results) from the multiplexer 21 through the register 20.

By performing such operations for the second to fourth rows (the seven to fifth rows) of the DCT transformation matrix of Formula (1), there are obtained the elements x0, x1, x2, x3, x4, x5, x6 and x7 of the first column of the output data. The eight data (elements) of the first column of the output data are transmitted, when held in the registers 19A and 19B, to the register 20, and they are sequentially selected by and outputted from the multiplexer 21. As a result, for the elements X0, X1, X2, X3, X4, X5, X6 and X7 of the first column of the input data inputted in a cycle of T (frequency: ϕ) to the DCT operation circuit 1, the elements x0, x1, x2, x3, x4, x5, x6 and x7 of the first column of the one-dimensional inverse DCT operation results are sequentially outputted in a cycle of T (frequency: ϕ).

By repeating such operations for the second to eighth columns of the input data, it is possible to obtain the one-dimensional DCT operation results of 8×8.

Here, the cumulative addition results are outputted at timings of 2T (frequency: ϕ/2) from the cumulative adders 30 and 31 to the registers 19A and 19B. Moreover, the timing control unit 22 generates the sign inverting signals at timings of T (frequency: ϕ) and outputs them to the sign inverter 32. As a result, the sign of every other addition result out of the addition results inputted in a cycle of T/2 (frequency: 2ϕ) from the adder 47 to the cumulative adder 31 is inverted.

Here, the DCT operation circuits of the foregoing first, second, third and fourth embodiments execute the inverse DCT operations when these embodiments are applied to an image data decoding process conforming of the MPEG or its corresponding standards.

Figure 9:
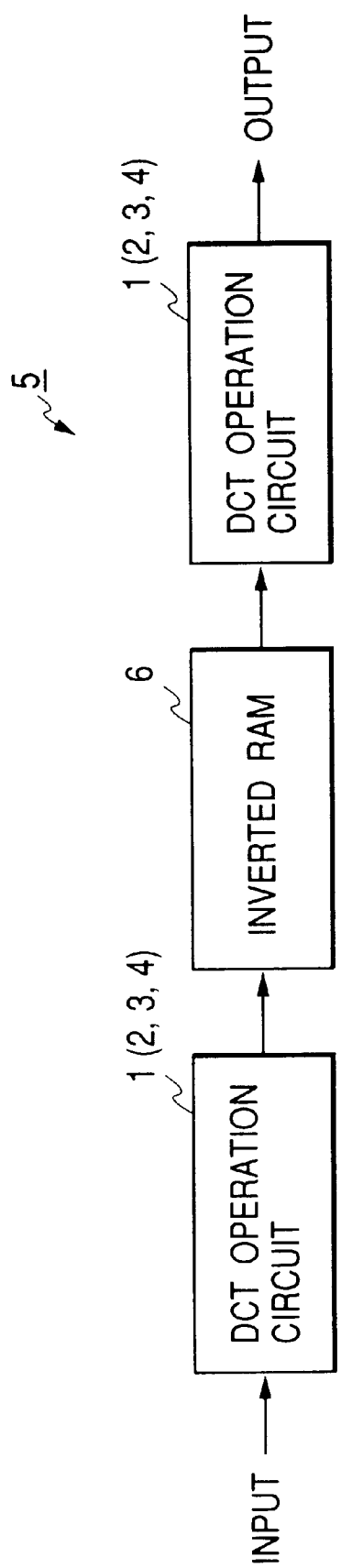
FIG. 9 is a block diagram showing a DCT operation circuit of a fifth embodiment schematically.

FIG. 9 is a block diagram showing a fifth embodiment of the DCT operation circuit according to the invention. A DCT operation circuit 5 of this fifth embodiment executes two-dimensional DCT operations by using the one-dimensional DCT operation circuit 1, 2, 3 or 4 of the foregoing first, second, third or fourth embodiment. In this two-dimensional operation circuit 5, the data of an input matrix are inputted to one one-dimensional DCT operation circuit 1 (2, 3 or 4) to effect the one-dimensional DCT operations, as described in conjunction with the first, second, third or fourth embodiment. This output is inputted to an inverted RAM 6, the output of which is inputted to the other one-dimensional DCT operation circuit 1 (2, 3 or 4). Then, the one-dimensional DCT operations described in conjunction with the first, second, third or fourth embodiment, so that the two-dimensional DCT operation results are obtained.

FIG. 10 is a time chart showing examples of the operation timings of the two-dimensional DCT operation circuit of the fifth embodiment. Upon receiving sixty four input data X00, X01, X02, . . . of an 8×8 matrix, the one-dimensional DCT operation circuit 1 (2, 3 or 4) on the input side of the two-dimensional DCT operation circuit 5 shown in FIG. 9 performs the one-dimensional DCT operations and outputs the operation results x00, x01, x02, . . . to the inverted RAM 6 after a fixed delay D1. Upon receiving to the sixty four operation results x00, x01, x02, . . . from the one-dimensional DCT operation circuit 1 (2, 3 or 4) on the input side, the inverted RAM 6 performs the matrix operations for exchanging the column elements and the row elements of the matrix comprising the received operation results, and outputs the results x00, x10, x20, . . . to the one-dimensional DCT operation circuit 1 (2, 3 or 4) on the output side. Upon receiving the sixty four operation results x00, x10, x20, . . . from the inverted RAM 6, the one-dimensional DCT operation circuit 1 (2, 3 or 4) on the output side performs an additional one-dimensional DCT operations for the received operation results, and outputs the operation results y00, y10, y20, . . . after a fixed delay D2. By these operations, it is possible to provide the two-dimensional DCT operation results.

When this embodiment is applied to the image data decoding process comforming to the MPEG or its corresponding standards, for example, each one-dimensional DCT operation circuit 1 (2, 3 or 4) executes the inverted DCT operations. In this case, the data of the matrix inputted to the two-dimensional DCT operation circuit 5 of this embodiment are the data which are prepared, although not specifically shown, by converting the data of an input image into DCT coefficients by another coding two-dimensional DCT operation circuit, quantizing and compressing the DCT coefficients by a quantizer, and decompressing the compressed coefficients by a reverse-quantizer. Moreover, the data outputted from the two-dimensional DCT operation circuit 5 are transmitted to the motion compensation predicting unit (not shown).

As has been described in detail, the one-dimensional DCT operation circuit 1 or 2 has either of the two constructions: a construction where there is provided one multiplier 13 operated with the normalized frequency 4 to multiply the elements of the DCT transformation coefficients and the elements of the input data sequentially, the multiplication results are added by the cumulative adder 15 to determine a pair of cumulative addition results which correspond to the respective sums and differences of the paired elements of the data to be outputted from the DCT operation circuit 1, the operations for determining the paired elements of the output data by adding and subtracting the cumulative addition results by the adder 17 and the subtracter 18 specific times the number of which is one-half of the number of elements of the column of the matrix of the input data, and all the elements of the matrix of the output data are determined by performing those operations predetermined times the number of which is equal to the number of elements of the row of the matrix of the input data; and a construction where the multiplication results obtained by the multiplier 13 operating with the normalized frequency 4 are added as they are by the first cumulative adder 30, and the sign of every other addition result is inverted to perform the additions by the second cumulative adder 31 specific times the number of which is one-half of the number of elements of the row of the matrix of the input data thereby to determine the elements of the column of the matrix of the output data, and these operations are performed specific times the number of which is equal to the number of elements of the column of the matrix of the input data to determine all the elements of the matrix of the output data. As a result, only one multiplier is used to reduce the scale of the DCT operation circuit 1 or 2, and the product of the number of multipliers and the normalized frequency is 4 at most, so that the power consumption can be reduced.

The one-dimensional DCT operation circuits 3 or 4 has either of the two constructions: a construction where there are provided the one-dimensional DCT operation circuits 3 and 4 which are equipped with the paired multipliers 42 and 45 to be operated with the normalized frequency 2 to effect the multiplications of the elements of one-half of the DCT transformation coefficients and the elements of one-half of the input data sequentially in parallel by the multipliers 42 and 45, thereby to determine the paired cumulative addition results corresponding to the respective sums and differences of the paired elements of the data outputted from the DCT operation circuits, the operations for determining the paired elements of the output data by adding and subtracting the addition results by the adder 17 and the subtracter 18, respectively, to determine the elements of the column of the matrix of the output data, and the operations are performed specific times the number of which is equal to the number of elements of the column of the matrix of the input data to determine all the elements of the matrix of the output data; and a construction where the multiplication results obtained from the paired multipliers 42 and 45 operated with the normalized frequency 2 are added by the adder 47, the resultant sums are added as they are by the first cumulative adder 30 and added by the second cumulative adder 31 after the sign of every other resultant sum is inverted. These additions are performed for one-half of the number of elements of the column of the matrix of the input data to determine the elements of the column of the matrix of the output data, the operations are performed specific times the number of which is equal to the number of elements of the column of the matrix of the input data to determine all the elements of the matrix of the output data. As a result, the product of the number of multipliers and the normalized frequency is 4 at most so that the power consumption can be reduced.

Moreover, the two-dimensional DCT operation circuit 5 is given one or two of the aforementioned four constructions including the two one-dimensional DCT operation circuits 1 (or 2, 3 or 4) and the inverted RAM 6. As a result, the total number of multipliers in the two one-dimensional DCT operation circuits 1 (or 2, 3 or 4) can be reduced to two or four, thereby reducing the scale of the two-dimensional DCT operation circuit 5. Moreover, the product of the number of multipliers in the two-dimensional DCT operation circuit 5 and the normalized frequency is 8 at most, so that the power consumption can be reduced.

Although the invention has been specifically described in conjunction with its embodiments, the invention should not be limited to the embodiments but can naturally be modified in various manners without departing from the gist thereof.

For example, the shift register 10, the hold register 11, the multiplexers 12 and 21, the registers 19A, 19B and 20, the timing control unit 22, the address counter 23 and so on should not be limited to those of the foregoing embodiments but can be modified in various manners.

Moreover, the invention should not be limited to the DCT transformation of 8×8 but can also be applied to a circuit for the DCT transformations of 4×4 and 16×16.

Our invention has been described mainly on the background which is the field of is application assumed to be applied to the decoding technique by the inverse DCT operations of coded image data. Despite of this description, however, the invention should not be limited to the application but can be utilized in a data processing system for the DCT transformation operations or the inverse DCT transformation operations.

INDUSTRIAL APPLICABILITY

According to the invention, as has been described hereinbefore, only one multiplier is used in the one-dimensional discrete cosine transformation operation circuit, so that the scale of the discrete cosine transformation operation circuit can be reduced, the produce of the number of multipliers and the normalized frequency is 4 at most, and hence the power consumption can be reduced.

What is claimed is:

1. A discrete cosine transformation operation circuit comprising:

an input data holding circuit which holds input data from outside in synchronization with a first timing signal having a first frequency;

a coefficient storage unit storing predetermined transformation coefficients;

a multiplier which multiplies a transformation coefficient from said coefficient storage unit and an input data from said input data holding circuit in synchronization with a second timing signal having a second frequency which is substantially four times as high as the first frequency;

a cumulative adder which executes cumulative adding operations for the multiplication results sequentially outputted from said multiplier and sequentially provides cumulative adding results; and an output circuit which operates in synchronization with a third timing signal having a third frequency lower than the second frequency and which includes operation circuits executing predetermined operations between the cumulative adding results sequentially outputted from said cumulative adder, to output a discrete cosine transformation operation result, wherein the predetermined transformation coefficients are DCT transformation coefficients, and wherein the output circuit includes an adder which executes an adding operation between the cumulative adding results;

a subtracter which executes a subtracting operation between the cumulative adding results;

a plurality of registers each of which holds one of an output from the adder and an output from the subtracter; and a multiplexer for selecting one of the outputs of said registers, wherein a discrete cosine transformation operation result is provided from said adder by adding a first cumulative adding result with a second cumulative adding result in the cumulative adding results, the other discrete cosine transformation operation result is provided from said subtracter by subtracting the first cumulative adding result with the second cumulative adding, the provided discrete cosine transformation operation results are stored in the registers and one of the discrete cosine transformation operation results held in the registers is outputted from the multiplexer.

2. A two-dimensional discrete cosine transformation operation circuit comprising:

a first operation circuit including a discrete cosine transformation operation circuit according to claim 1, and executing an operation of a discrete cosine transformation for data provided from a matrix including a plurality of input data;

an inverted RAM receiving data which are output from said first discrete cosine transformation operation circuit and which are output so as to form an input matrix, and generating an inverted matrix in which elements of a row and elements of a column of said input matrix are exchanged; and a second operation circuit including a discrete cosine transformation operation circuit according to claim 1, and executing an operation of a discrete cosine transformation for data provided from said inverted matrix.

3. A discrete cosine transformation operation circuit according to claim 1, wherein the cumulative adder operates in accordance with the second frequency and sequentially provides the cumulative adding results in accordance with the first frequency.

* * * * *